(12) United States Patent
Mueller et al.

(10) Patent No.: US 12,254,777 B2
(45) Date of Patent: Mar. 18, 2025

(54) CLOUD SERVICE INTEGRATION WITH ONBOARD VEHICLE SYSTEM

(71) Applicant: Joby Aero, Inc., Santa Cruz, CA (US)

(72) Inventors: Eric Mueller, San Francisco, CA (US); Christabelle Bosson, Mountain View, CA (US); Gregory Mark Gerard Belaus, Santa Clara, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 914 days.

(21) Appl. No.: 17/303,418

(22) Filed: May 28, 2021

(65) Prior Publication Data

US 2021/0375142 A1    Dec. 2, 2021

Related U.S. Application Data

(60) Provisional application No. 63/031,210, filed on May 28, 2020.

(51) Int. Cl.
*G08G 5/00* (2006.01)
*B64D 43/00* (2006.01)

(52) U.S. Cl.
CPC ........... *G08G 5/0013* (2013.01); *B64D 43/00* (2013.01); *G08G 5/0039* (2013.01)

(58) Field of Classification Search
CPC .. G08G 5/0013; G08G 5/0039; G08G 5/0052; B64D 43/00
See application file for complete search history.

(56) References Cited

U.S. PATENT DOCUMENTS

| | | | |
|---|---|---|---|
| 3,035,789 A | 5/1962 | Young | |
| 4,022,405 A | 5/1977 | Peterson | |

(Continued)

FOREIGN PATENT DOCUMENTS

| | | | |
|---|---|---|---|
| EP | 0945841 A1 | 9/1999 | |
| EP | 2698749 A1 | 2/2014 | |

(Continued)

OTHER PUBLICATIONS

Bennaceur et al., "Passenger-centric urban air mobility: Fairness trade-offs and operational efficiency", Transportation Research Part C: Emerging Technologies, 2022, 29 pages.

(Continued)

*Primary Examiner* — Shon G Foley
(74) *Attorney, Agent, or Firm* — Dority & Manning, P.A.

(57) ABSTRACT

Example embodiments are directed to systems and methods for providing cloud service to an onboard aerial vehicle system. A cloud service system accesses a flight related data. Using the flight related data, the cloud service system generates flight operations in a format of an avionics system on an aerial vehicle. A communication link is established over a communication network between the cloud service system and the aerial vehicle and the generated flight operations is transmitted to the aerial vehicle as digital data sent as data packets. The cloud service system then monitors, in real time, the aerial vehicle during a flight, wherein the monitoring comprises receiving and storing in-flight data from the aerial vehicle and the in-flight data is data reconstructed from a plurality of data packets received from the aerial vehicle. The cloud service system determines, based on the received in-flight data, whether to update the flight operations.

18 Claims, 5 Drawing Sheets

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 9,205,930 B2 | 12/2015 | Yanagawa |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,304,344 B2 | 5/2019 | Moravek et al. |
| 10,330,482 B2 | 6/2019 | Chen et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2010/0079342 A1 | 4/2010 | Smith et al. |
| 2014/0179535 A1 | 6/2014 | Stückl et al. |
| 2016/0009390 A1* | 1/2016 | Kugelmass ............... H04Q 9/00 701/3 |
| 2016/0012731 A1* | 1/2016 | Limbaugh ............. H04W 4/029 701/120 |
| 2016/0311529 A1 | 10/2016 | Brotherton-Ratcliffe et al. |
| 2017/0197710 A1 | 7/2017 | Ma |
| 2017/0357914 A1 | 12/2017 | Tulabandhula et al. |
| 2018/0018887 A1 | 1/2018 | Sharma et al. |
| 2018/0053425 A1 | 2/2018 | Adler et al. |
| 2018/0216988 A1 | 8/2018 | Nance |
| 2018/0233054 A1* | 8/2018 | Woon ................... G08G 5/0056 |
| 2018/0308366 A1 | 10/2018 | Goel et al. |
| 2018/0354636 A1 | 12/2018 | Darnell et al. |
| 2018/0357909 A1* | 12/2018 | Eyhorn ................ G08G 5/0039 |
| 2019/0146508 A1 | 5/2019 | Dean et al. |
| 2019/0221127 A1 | 7/2019 | Shannon |
| 2019/0316849 A1 | 10/2019 | Abrego et al. |
| 2020/0103922 A1 | 4/2020 | Nonami et al. |
| 2020/0388166 A1 | 12/2020 | Rostamzadeh et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", in Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

CLOUD SERVICE INTEGRATION WITH ONBOARD VEHICLE SYSTEM

REFERENCE TO RELATED APPLICATIONS

This application claims the priority benefit of U.S. Provisional Patent Application No. 63/031,210 filed May 28, 2020 and entitled "Cloud Service Integration with Onboard Vehicle System," which is incorporated herein by reference in its entirety.

TECHNICAL FIELD

The subject matter disclosed herein generally relates to special-purpose machines configured for providing cloud services to vehicles in operation, and to the technologies by which such special-purpose machines become improved compared to other machines that provide cloud services. Specifically, the present disclosure addresses systems and methods that integrate cloud services with an onboard aerial vehicle system to provide digital and automated exchange of information during flight.

BACKGROUND

Conventionally, aerial vehicles have onboard computers. However, there is no digital information being sent from the ground to the onboard computers for airspace management of flight operations. Instead, information is verbally relayed to a pilot by an air traffic controller and the pilot manually enters information, such as a route, into the onboard computers. The verbal relay and manual entry of information is prone to human error or misunderstanding. Additionally, little to no in-flight information is provided in flight by the onboard computers to ground systems for air traffic control purposes.

BRIEF DESCRIPTION OF THE DRAWINGS

Some embodiments are illustrated by way of example and not limitation in the figures of the accompanying drawings.

DETAILED DESCRIPTION

Figure 1:
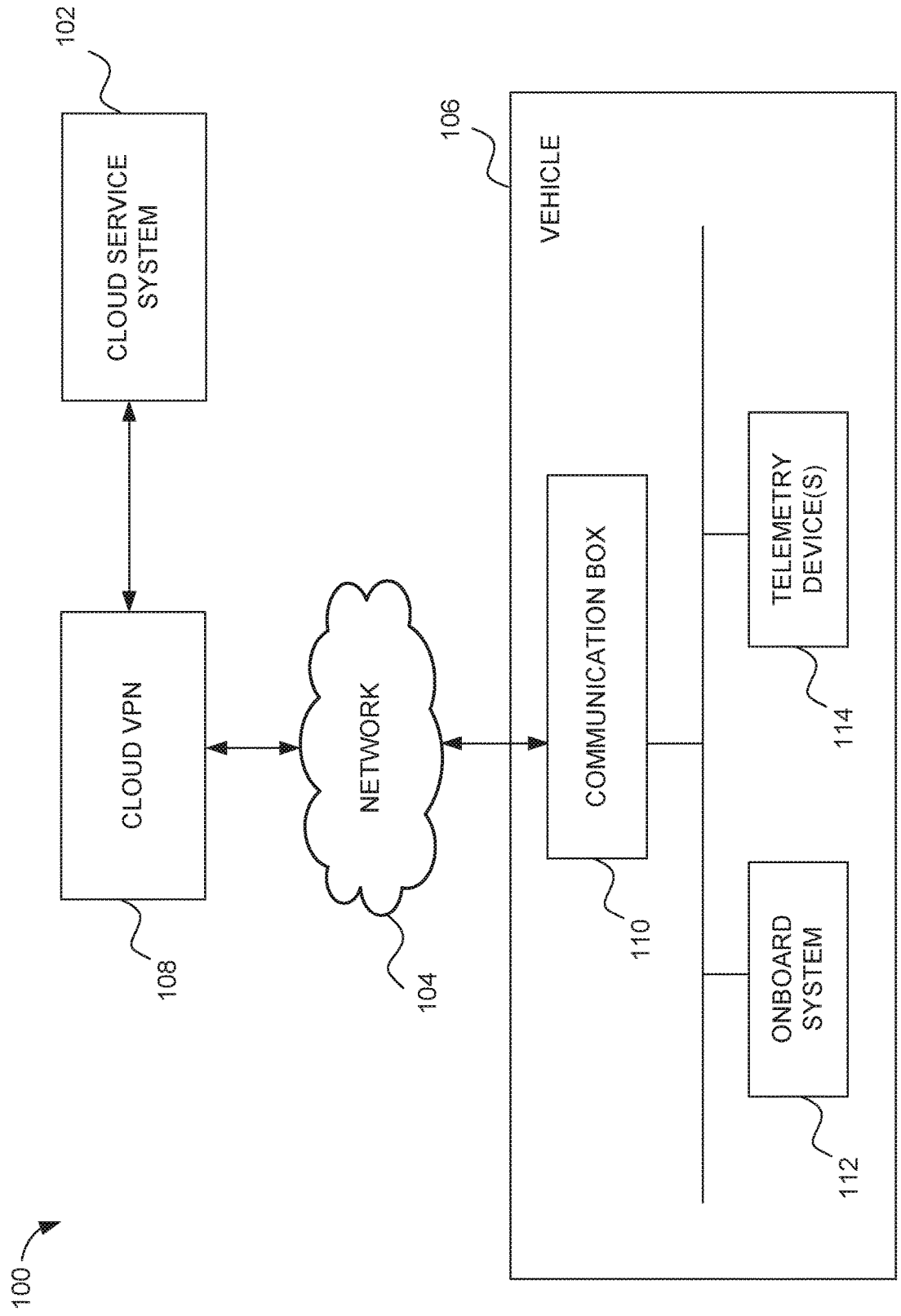
FIG. 1 is a diagram illustrating a network environment suitable for integrating cloud services with an onboard vehicle system, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations, Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for integrating cloud services with an onboard vehicle system. In example embodiments, a ground-based cloud service system is communicatively linked via a communications network to an aerial vehicle throughout a flight. The cloud service system generates and transmits digital information such as flight operations or plans to the aerial vehicle. In one embodiment, the flight operations are provided to a handheld onboard system (e.g., a tablet) that comprises a pilot application. The pilot application presents the flight operations to a pilot who can review and load flight operations (e.g., flight procedures) into the aerial vehicle's avionics. The flight operations can be updated during the flight, for example, to cause reroutes to occur. Alternatively or in addition, the flight operations can be provided directly, by the cloud service system, to a portion of the avionics to control the avionics without pilot intervention (e.g., in an autonomous embodiment).

The aerial vehicle, via a portable communication box, provides digital information such as in-flight data to the cloud service system. The in-flight data includes telemetry data and vehicle data from the avionics and/or pilot (also referred to as "pilot feedback"). The vehicle data can include, for example, energy levels (e.g., fuel), engine/propulsion system status, and predictive maintenance data during the flight. The communication box may also provide status of one or more systems on the aerial vehicle (e.g., health of the system or connectivity between the aerial vehicle 106 and the cloud service system 102, flap or gear positions). The cloud service system receives the telemetry data and vehicle data and can analyze the data while the aerial vehicle is still in flight (e.g., in real time), If a deviation is needed, the cloud service system updates the flight operations and transmits the update flight operations to the aerial vehicle. In some embodiments, the cloud service system uses machine learning or heuristics to train a component of the cloud service system to automatically generate and revise flight operations (e.g., routes or reroutes). While example embodiments discuss the provisioning of in-flight data, it is noted that the communication box also provides a link and data services while on the ground.

In example embodiments, the communication box comprises a multi-modem cellular router. As such, digital information (e.g., the flight operations, telemetry data, and vehicle data) are sent as duplicate data packets over multiple network connections. This provides redundancy and reliability. While example embodiments discuss the communication box as being portable (e.g., carried by a pilot between aerial vehicles), alternative embodiments may comprise a permanent communication box embodied within the aerial vehicle.

FIG. 1 is a diagram illustrating a network environment 100 suitable for integrating cloud services with an onboard vehicle system, in accordance with example embodiments. The network environment 100 includes a ground-based cloud service system 102 communicatively coupled via a network 104 to an aerial vehicle 106. In some embodiments, a cloud virtual private network (VPN) is positioned between the cloud service system 102 and the network 104.

In example embodiments, the cloud service system 102 comprises components that obtain, store, and analyze flight-related data (e.g., routing information, passenger information, origin, destination, weight and balances) and in-flight data received during flight of the aerial vehicle 106 or shortly thereafter (e.g., telemetry data, pilot feedback, communication system health, energy status). The cloud service system 102 also generates and updates flight operations (e.g., flight procedures) and transmits the flight operations to the aerial vehicle 106. In various embodiments, the generating and updating is performed automatically by the cloud service system 102. The components of the cloud service system 102 are described in more detail in connection with FIG. 2 and may be implemented in a computer system, as described below with respect to FIG. 5.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In some embodiments, a user (e.g., a requester of a transportation service) operates a device (not shown) that executes a client application associated with the cloud service system 102 to request transportation service from an origin to a destination. The request is communicated to the cloud service system 102, which uses the origin, destination, and passenger information (e.g., number of passengers) in generating the flight operations.

In example embodiments, the aerial vehicle 106 (e.g., helicopter, airplane) provides transportation service to the user. The transportation service includes transporting passengers, cargo, or a combination of both from an origin to a destination. In example embodiments, the aerial vehicle 106 includes a communication box 110, an onboard system 112, and one or more telemetry devices 114 all communicatively coupled to communicate with each other (e.g., by the communications box 110). The aerial vehicle comprises other components that are not pertinent to example embodiments and thus are not shown.

The communication box 110 provides a portable network connection (e.g., the Internet) between the components within the aerial vehicle 106 and the cloud service system 102. In example embodiments, the communication box 110 is a portable device that can be transported between different aerial vehicles (e.g., embodied within a container and carried by a pilot from one vehicle to another). In one embodiment, the communication box 110 comprises a multi-modem network router (e.g., a 4-modem cellular router) that communicatively couples the aerial vehicle 106 to the network 104.

The multi-modem network router provides redundancy and reliability to ensure that data packets sent through the network 104 are received by respective systems (e.g., the cloud service system 102, the onboard system 112). It is noted that any number of cellular routers can be used in various embodiments.

The communication box 110 also provides connectivity for the various components within the aerial vehicle 106. In some embodiments, the communication box 110 uses a wireless connection to communication with components of the aerial vehicle 106 (e.g., avionics), such as Wi-Fi or Bluetooth. In alternative embodiments, the communication box 110 uses a wired connection to communicate with one or more components of the aerial vehicle 106. Once communicatively connected with the various components, the communication box 110 can obtain information from or provide information to the various components. For example, the communication box can obtain status information (e.g., fuel reading, malfunction indication) from a component and provide instructions to control another component. In various embodiments, the components include avionics on the aerial vehicle 106.

In some embodiments, the communication box 110 can provide an indication of the health of connectivity between the aerial vehicle 106 and the cloud service system 102. For example, a mechanism can be used such that availability of communications between the air (e.g., the communication box 110) and ground (e.g., the cloud service system 102) is continuously monitored independent of the data that is sent. This can be important in that if communication via the communication box 110 is not available, alternative methods of communication can be employed (e.g., via voice communication to the pilot). While the communication box 110 is discussed as a portable device, alternative embodiments may include the communication box 110, or its functional components, as a permanent part of the aerial vehicle 106.

In example embodiments, the flight operations sent by the cloud service system 102 are transmitted to the onboard system 112 via the communication box 110. In one embodiment, the onboard system 112 comprises a tablet or similar handheld device capable of running a pilot application that displays information to a pilot and collects information from the pilot. More specifically, the onboard system 112 receives the flight operations and the pilot application displays a flight plan to the pilot. The onboard system 112 may also receive passenger information and data related to air space management services. The flight operations include one or more of a recommended route, take-off time, diversions (e.g., a landing location is crowded and the aerial vehicle 106 needs to land at a secondary location), reroutes (e.g., due to bad weather, turbulence), or other operational information.

In some embodiments, digital data received from the cloud service system 102 (as part of or in addition to the flight operations) can trigger an event in the aerial vehicle 106. For example, the digital data may cause a safety video to automatically play on the aerial vehicle 106. The triggering may occur via a connection (e.g., Bluetooth; Wi-Fi via the communication box 110) between the onboard system 112 and another component (e.g., speaker; entertainment system) within the aerial vehicle 106. For example, a pilot viewing the digital data on the onboard system 112 (e.g., a tablet running the pilot application) can trigger another component, via the onboard system 112, to perform an operation.

The pilot application also allows the pilot to provide information to the cloud service system 102 (referred to as "pilot feedback"). For example, energy readings (e.g., fuel amount) may be sent back using the pilot application. Additionally, the pilot can provide other feedback regarding the flight (e.g., reroutes, bird sightings, report problems) through the pilot application. The pilot feedback can be provided before, during, or after the flight is complete. In some cases, the pilot feedback comprises pilot-initiated interactions on the pilot application associated with procedures during events on the flight (e.g., takeoff, landing). As such, the pilot application acts as a proxy for verbal radio communications associated with traditional air transportation.

In a further embodiment, the onboard system 112 comprises a portion of an avionics system of the aerial vehicle 106 (e.g., the onboard system 112 is built into the avionics system of the aerial vehicle 106 or is communicatively connected to the avionics system). In this embodiment, the flight operations or other digital data are uploaded directly to the avionics system (e.g., received directly by the avionics system). This allows the cloud service system 102 to automatically control aspects and/or functionalities of the aerial vehicle 106. Additionally, the onboard system 112 (e.g., avionics) can directly provide status and data to the communication box 110 which then relays the data back to the cloud service system 102 in substantially real time. While embodiments are discussed whereby the onboard system 112 comprises a portion of the avionics system, alternative embodiments may have the onboard system 112 be embodied in another component of the aerial vehicle 106. In these embodiments, the component can be automatically controlled by the cloud service system 102.

The telemetry devices 114 comprise devices that include, or are in communication with, sensors to detect various telemetry data. For example, the telemetry devices 114 can be an electronic flight bag (EFB) and/or a GPS device. The telemetry data includes, for example, location (e.g., latitude and longitude), altitude, velocity, and/or angles (e.g., heading, pitch, roll). The latitude, longitude, and altitude can be associated with a time stamp to create four-dimensional telemetry data. Additionally, a source (e.g., sensor) providing the telemetry data is detected and reported with the telemetry data. In example embodiments, the telemetry data is transmitted back to the cloud service system 102 through the communication box 110 in real time. This allows the cloud service system 102 to monitor the flight in real time and update and transmit flight operations, if necessary. As a result, the cloud service system 102 can monitor their aerial vehicles without relying on third-party providers of flight information.

In example embodiments, the telemetry data, data from the onboard system 112 (e.g., pilot feedback from the pilot application on a tablet or directly from the avionics system for an autonomous embodiment), and any vehicle data that needs to be transmitted back to the cloud service system 102 (e.g., communications system statuses) are transmitted by the communication box 110 using the multi-modem network router. For example, the multi-modem network router can be a 4-modem cellular router. In this example, packets are duplicated across four separate cellular connections and sent over the network 104. The cloud VPN 108 aggregates the packets and reconstructs the data that is then provided to the cloud service system 102. While a 4-modem cellular router is discussed herein, alternative embodiments can use an any number modem cellular router.

In some embodiments, the data can be exchanged via a Wi-Fi access point. In cases where the aerial vehicle is close to the ground (e.g., within 100 meters), the communication box 110 can access the Wi-Fi access point and exchange digital data via the Wi-Fi access point.

In example embodiments, any of the systems, machines, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 5, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined into a component, and the functions described herein for any single component may be subdivided among multiple component. Additionally, any number of aerial vehicles 106 may be embodied within the network environment 100. Furthermore, some components or functions of the network environment 100 may be combined or located elsewhere in the network environment 100. For example, some of the functions of the cloud service system 102 may be embodied within other systems or devices of the network environment 100, which may not be shown. While only a single cloud service system 102 is shown, alternative embodiments may contemplate having more than one cloud service system 102 to perform operations discussed herein.

Figure 2:
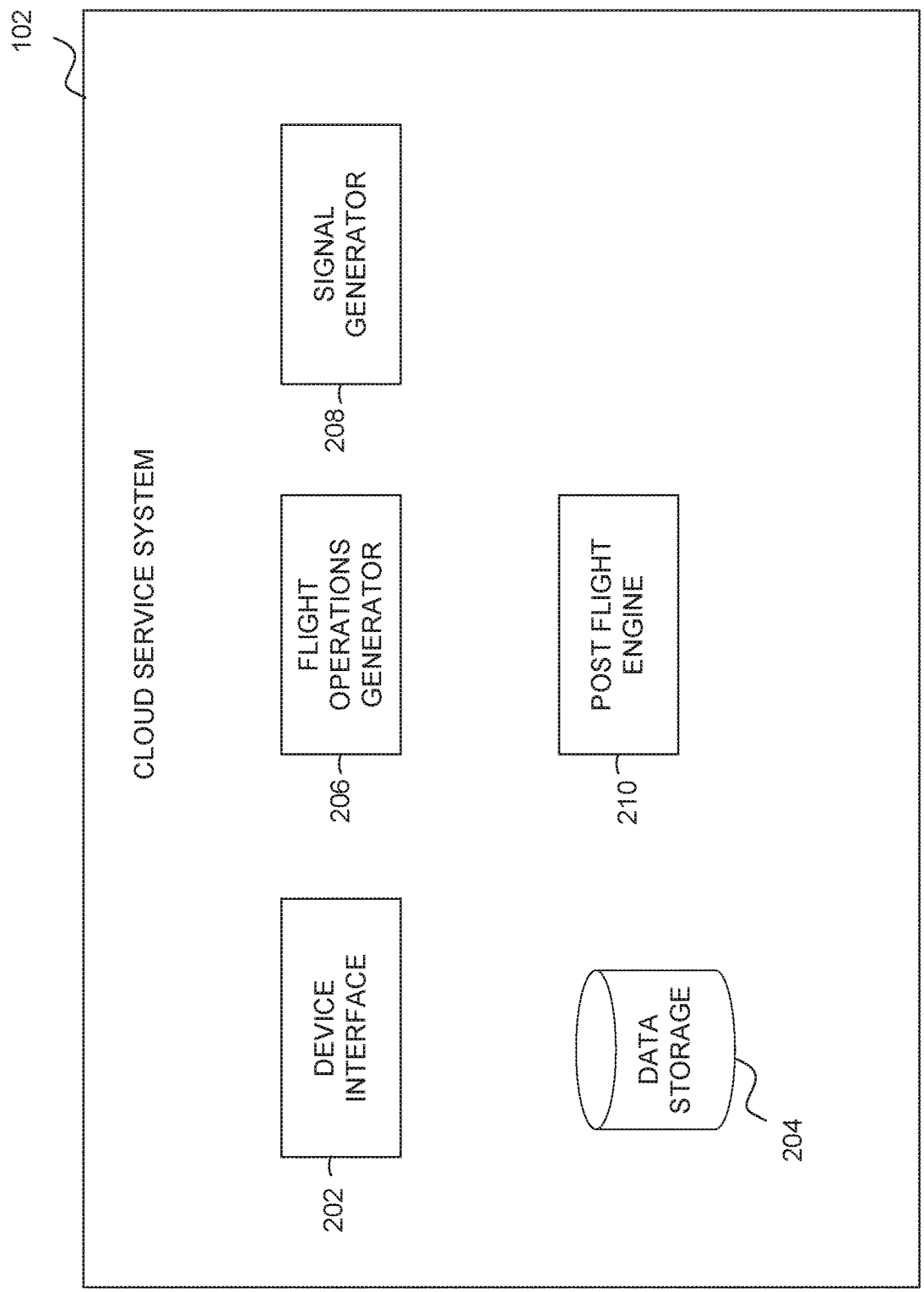
FIG. 2 is a block diagram illustrating components of a cloud service system, according to some example embodiments.

FIG. 2 is a block diagram illustrating components of the cloud service system 102, according to some example embodiments. In various embodiments, the cloud service system 102 comprises components that obtain, store, and analyze flight related data (e.g., routing information, passenger information, origin, destination) and in-flight data received from the aerial vehicle 106 (e.g., telemetry data, pilot feedback, system statuses). The cloud service system 102 also generates and updates flight operations (e.g., flight procedures) and transmits the flight operations to the aerial vehicle 106 before and during the flight. To enable these operations, the cloud service system 102 comprises a device interface 202, a data storage 204, a flight operations generator 206, a signal engine 208, and a post flight engine 210 all configured to communicate with each other (e.g., via a bus, shared memory, or a switch). The cloud service system 102 may comprise other components (not shown) that are not pertinent to example embodiments. Furthermore, any one or more of the components (e.g., engines, interfaces, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with aerial vehicles (e.g., aerial vehicle 106) and other systems (e.g., third-party systems; transportation request system) or devices (e.g., a user device directly requesting a transportation service) that provide data for analysis by the cloud service system 102. For example, the device interface 202 receives an indication of the origin and destination for a transportation service. The device interface 202 also receives real-time data from an in-flight aerial vehicle 106 such as telemetry data. Additionally, the device interface 202 causes presentation of data or triggers provided by the cloud service system 102 at the aerial vehicle 106. For example, the device interface 202 transmits flight operations over the network 104 to the aerial vehicle 106 for display on a device associated with the onboard system 112 or directly to a component on the aerial vehicle 106 to automatically trigger an event onboard.

The flight operations generator 206 generates and updates flight operations. Accordingly, the flight operations generator 206 initially receives trip data for a transportation service request (e.g., origin, destination, number of passengers, time for requested transport). The flight operations generator 206 accesses routing information and vehicle information from the data storage 204. In one embodiment, the routing information includes information on skylanes. Skylanes are predetermined flight paths along which aircraft are typically routed but that may change to accommodate changing demand patterns, weather, airspace restrictions, or other dynamic considerations.

Using all of this information, the flight operations generator 206 creates flight operations or plans for a transportation service. The flight operations are created in a format that can be understood by the onboard system 112. Flight computers (e.g., avionics) on the aerial vehicle 106 use a specific format to specify routes (also referred to as "procedures"). The flight operations generator 206 converts routing information into a format that the avionics on an aerial vehicle selected to provide the transportation service can directly understand. As such, the flight operations provide the routes as procedures in a format that the avionics recognizes.

In some embodiments, the flight operations generator 206 uses machine learning to generate flight operations. For example, a training set of historical trip data, routing information, vehicle information and previous flight operations is used to train a flight operations model. That model determines a preliminary set of flight operations by the flight operations generator 206, and then the machine learning algorithms update the flight operations as trip requests are received to ensure the greatest proportion of demand can be served.

In some embodiments, heuristics can be used to assist a human operator in the generation of flight operations. For example, historical data of flight operations based on various past factors such as passenger demand, weather conditions, vehicle availability and usage, skylane/skyport availability and usage, and/or other factors can be analyzed. The flight operations generator 206 can then select, during runtime, past operational periods that match the patterns of current factors. The human operator uses the outcomes of previous operational periods to create a flight operation set that is matched to the current conditions.

In yet further embodiments, a combination of machine-learning and heuristics can be used to generate flight operations by the flight operations generator 206. The machine learning algorithms take all previous operational periods and map the difference between them and the current set of factors. The differences can then be used to adapt the nominal set of flight operations and present recommendations to the human operator. The operator uses heuristics to update the set of operations and can use machine learning approaches to assess the proportion of demand served, impacts of weather, and other operational considerations. It is noted that the human operator can be replaced by a machine in alternative embodiments.

During a flight, the flight operations generator 206 receives the telemetry data along with vehicle data (e.g., pilot feedback) and aircraft system data and determines whether the flight operations need to be updated. More particularly, the flight operations generator 206 may detect a condition that may require a deviation from a current flight plan. Such conditions can include, for example, an onboard equipment failure, a change in airspace, a medical issue, or any unforeseen operational conditions. If a deviation is needed, the flight operations generator 206 can automatically generate and send an updated flight plan or flight operations that includes updated reroute details for a reroute.

The signal generator 208 generates signals that can trigger events on the aerial vehicle 106. For instance, the signal generator 208 can generate a signal that causes the onboard system 112 to play a safety video prior to takeoff or play a pre-landing audio, display passenger manifest information, and show weight and balance calculations. The signals are transmitted, via the device interface 202, to the aerial vehicle 106. In some cases, the signals are provided directly, via the communication box, to a corresponding component on the aerial vehicle to trigger the corresponding action. For instance, a signal to play a safety video can be transmitted to an AN system on the aerial vehicle 106 and automatically cause the A/V system to play the safety vehicle. In other embodiments, the signals are relayed via the onboard system 112.

The post flight engine 210 performs analysis after completion of the flight. In example embodiments, the post flight engine 210 takes the telemetry data received and stored during the flight along with data from the onboard system 112 (e.g., pilot feedback, energy levels, component statuses) and other data if being used (e.g., third-party data such as weather reports) and analyzes all the data. The analysis may be used to optimize future flight operations, support safety cases, and define requirements for enhanced capabilities and aircraft equipage. For example, flight operations planning requires assumptions about what demand patterns will exist leading up to an operation's departure time. These assumptions are used to decide, for example, whether to create a flight operation several days in advance given the likelihood of additional riders filling the remaining seats of the aircraft for that operation. In some embodiments, the analyzed data can be used as feedback to update the demand assumptions and optimize the flight operations generator 206.

Figure 3:
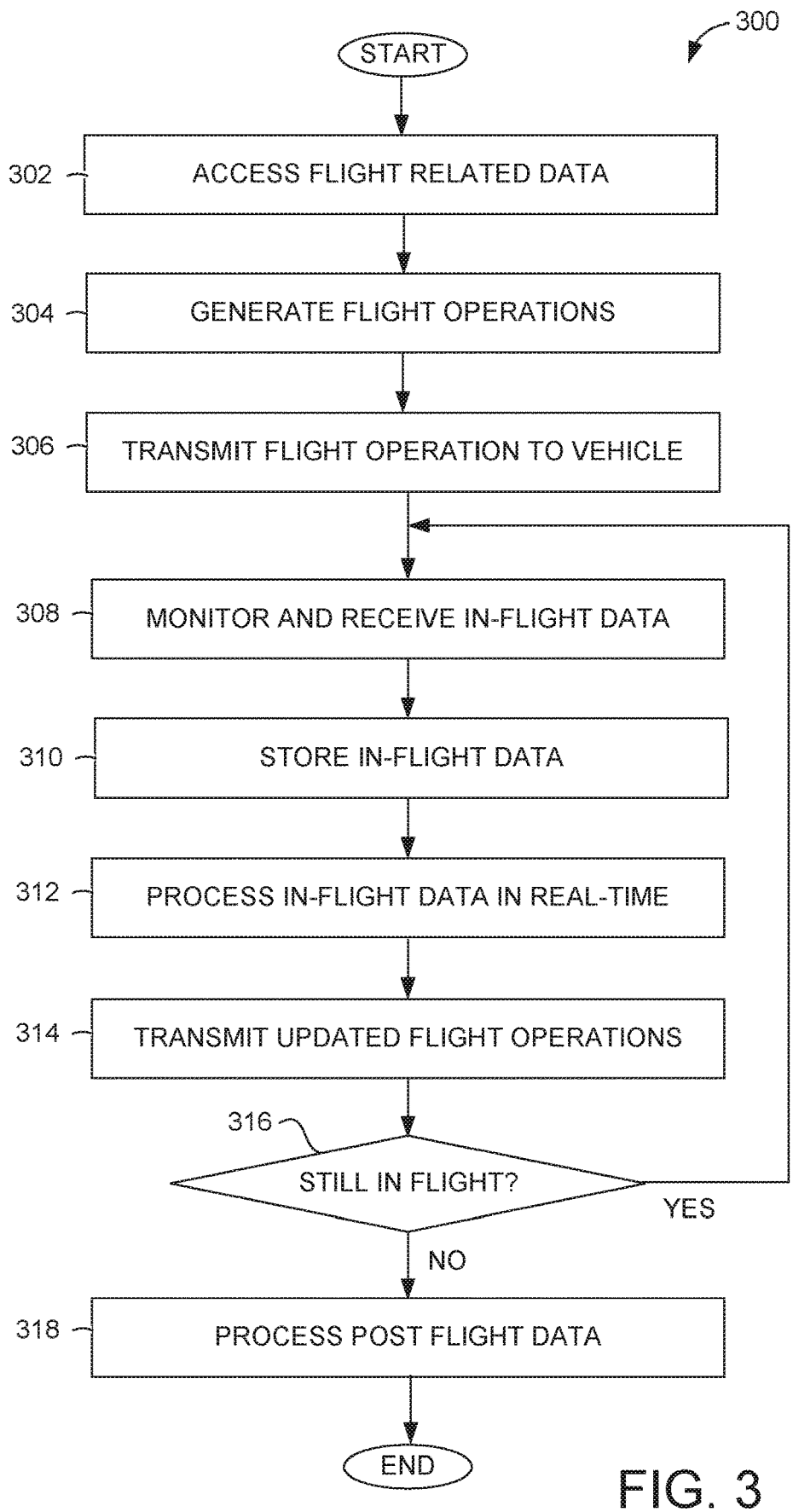
FIG. 3 is a flowchart illustrating operations of a method, at the cloud service system, for integrating cloud services with the onboard vehicle system, according to some example embodiments.

FIG. 3 is a flowchart illustrating operations of a method 300, at the cloud service system 102, for integrating cloud services with an onboard vehicle system, according to some example embodiments. Operations in the method 300 may be performed by the cloud service system 102, using components described above with respect to FIG. 2. Accordingly, the method 300 is described by way of example with reference to the cloud service system 102. However, it shall be appreciated that at least some of the operations of the method 300 may be deployed on various other hardware configurations or be performed by similar components residing elsewhere in the network environment 100. Therefore, the method 300 is not intended to be limited to the cloud service system 102.

In operation 302, the flight operations generator 206 accesses flight related data. The flight related data includes information associated with a transportation request received via the device interface 202 and includes an indication of an origin and a destination for a trip, a number of passengers, and a time for the trip (e.g., a scheduled time in the future or as soon as possible). The flight related data also includes routing information and vehicle information accessed from the data storage 204.

In operation 304, the flight operations generator 206 generates flight operations for the requested transportation service using the data accessed in operation 302. The flight operations are created in a format that can be understood by the onboard system 112. As such, the flight operations generator 206 assigns (or receives an indication of the aerial vehicle assigned to the transportation service) and determines the format required for the avionics of that aerial vehicle. The flight operations generator 206 generates (or converts) routing information in a format that the avionics of the assigned vehicle can directly understand. In one embodiment, the flight operations may be generated, in part, by a human, using a machine-trained flight operations model, based on heuristics, or any combination of these. Flight operations are generated using combinations of prior-validated information: origin and destination aerodromes, departure, arrival, approach procedures, and potentially other navigation elements.

In operation 306, the device interface 202 transmits the flight operations to the aerial vehicle 106. In example embodiments, the flight operations are transmitted via the cloud VPN 108 through the network 104 to the communication box 110 located on the aerial vehicle 106. In some embodiments, the cloud VPN 108 duplicates the flight operations and sends multiple copies through different network service providers or connections to ensure that the flight operations are received by the aerial vehicle 106 (e.g., by the communication box 110).

In operation 308, while the aerial is in flight, the cloud service system 102 monitors the flight and receives digital in-flight data. In various embodiments, the monitoring is continuous, and the digital in-flight data is received in real time. The digital in-flight data may include real-time telemetry data and vehicle data (e.g., any pilot feedback, data from the onboard system 112/avionics or components). In operation 310, the in-flight data is stored and may be used for in-flight and post-flight analysis.

In operation 312, the cloud service system 102 processes the in-flight data in real time (or substantially real time). The processing can include computing and revising, in real time, the estimate time of arrival of the aerial vehicle at its destination). In example embodiments, the flight operations generator 206 may also detect data that causes a deviation from the original flight operations to be needed. For example, there may be onboard equipment failure, a medical emergency, a flock of birds, or some wind that requires deviation from a normal fight plan. In these situations, the flight operations generator 206 updates/revises the original flight operations. The process to revise is similar to the generating of the original flight operation in operation 304. The flight operations generator 206 may also detect that the aircraft is at a lower state of charge than expected and add a charging interval at the next appropriate verti port, potentially affecting later operations.

In operation 314, the device interface 202 transmits the updated flight operations back to the aerial vehicle. If no updates are required, however, then operation 314 can be skipped.

In operation 316, a determination is made as to whether the aerial vehicle 106 is still in flight. This may be determined from the fact that in-flight data is still being received from the aerial vehicle 106 or by lack of vehicle data indicating landing of the aerial vehicle 106.

If the aerial vehicle 106 is still in flight, then the method 300 returns to operation 308 to continue monitoring the flight and receiving the in-flight data. Alternative, if the aerial vehicle 106 is no longer in flight, then in operation 318, the post flight engine 210 processes the flight data. Accordingly, the post flight engine 210 takes the telemetry data received and stored during the flight along with data from the onboard system 112 (e.g., pilot feedback, energy levels) and other data (e.g., 3P data such as weather reports) and performs an analysis The analysis may be used to optimize future flight operations or control of the aerial vehicle 106.

Figure 4:
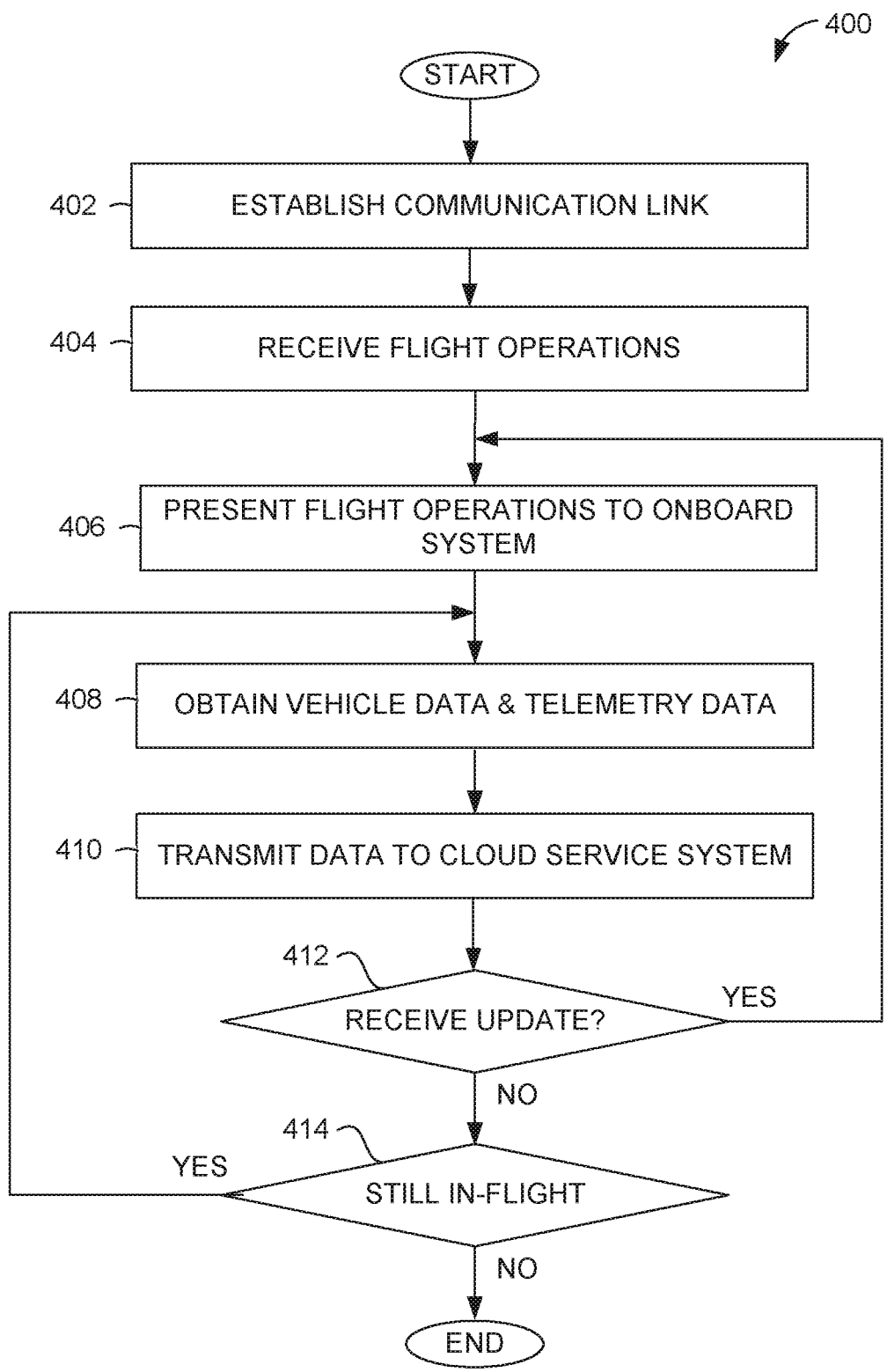
FIG. 4 is a flowchart illustrating operations of a method, on an aerial vehicle for integrating cloud services with an onboard vehicle system, according to some example embodiments.

FIG. 4 is a flowchart illustrating operations of a method 400, on an aerial vehicle, for integrating cloud services with an onboard vehicle system, according to some example embodiments. Operations in the method 400 may be performed by components on the aerial vehicle such as the aerial vehicle 106. Accordingly, the method 400 is described by way of example with reference to the components on the aerial vehicle 106. However, it shall be appreciated that at least some of the operations of the method 400 may be deployed on various other hardware configurations. Therefore, the method 400 is not intended to be limited to the example embodiment of the aerial vehicle 106 shown in FIG. 1.

In operation 402, the communication box 110 establishes a communication link with the cloud service system 102. In one embodiment, the communication box 110 comprises a multi-modem network router (e.g., a 4-modem cellular router) that communicatively couples the aerial vehicle 106 to the network 104. The multi-modem provides redundancy and reliability to ensure that data packets sent via the network 104 are received by respective systems (e.g., the cloud service system 102, the onboard system 112), The communication box 110 also provides communication connectivity for the various components within the aerial vehicle 106.

In operation 404, the communication box 110 receives flight operations from the cloud service system 102. In one embodiment, the flight operations are received as data packets over multiple data connections for redundancy. In this embodiment, the communication box 110 is configured to assemble the data packets in a correct order.

In operation 406, the communications box 110 presents the flight operations to the onboard system 112. In one embodiment, a pilot application of the onboard system 112 displays a flight plan to the pilot. The pilot application may also receive and display passenger information and data related to air space management services. The flight operations include one or more of a recommended route, take-off time, or other operational information.

In an alternative embodiment, the onboard system 112 comprises a portion of the avionics system or other components of the aerial vehicle 106. In this embodiment, the flight operations are uploaded directly to the avionics system or components. For example, a flight plan can be loaded directly into an auto-pilot system. This allows the cloud service system 102 to automatically control aspects and/or functionalities of the aerial vehicle 106.

In operation 408, the communications box 110 obtains vehicle data (e.g., pilot feedback; system status; energy levels) and telemetry data to be sent back to the cloud service system 102. The pilot feedback may include information input by a pilot through the pilot application on the onboard system 112. In some cases, the input comprises pilot-initiated interactions on the pilot application associated with procedures during events on the flight (e.g., takeoff, landing). The telemetry data is obtained from one or more telemetry devices 114. The telemetry data includes, for example, location coordinates), altitude, velocity, and pitch, each associated with a time stamp to create four-dimensional telemetry data. Additionally, a source (e.g., sensor) providing the telemetry data is also detected and reported with the telemetry data. Other data can include system statuses directly obtained from the avionics or components of the aerial vehicle 106.

In operation 410, the communication box 110 transmits the in-flight data (e.g., pilot feedback, telemetry data, system status) to the cloud service system 102. In one embodiment, the in-flight data is transmitted using a 4-modem cellular router of the communication box 110, whereby packets are duplicated across four separate cellular connections and sent over the network 104. In this embodiment, the cloud VPN 108 aggregates the packets and reconstructs the data that is then provided to the cloud service system 102.

In operation 412, a determination is made whether updated flight operations are received. If updated flight operations are received, the method 400 returns to operation 406 where the updated flight operations are presented to the onboard system 112. If no updated flight operations are received, then in operation 414, a determination is made as to whether the aerial vehicle 106 is still in flight. If the aerial vehicle 106 is still in flight, then the method 400 returns to operation 408 where vehicle data and telemetry data is obtained and transmitted back in operation 410.

Figure 5:
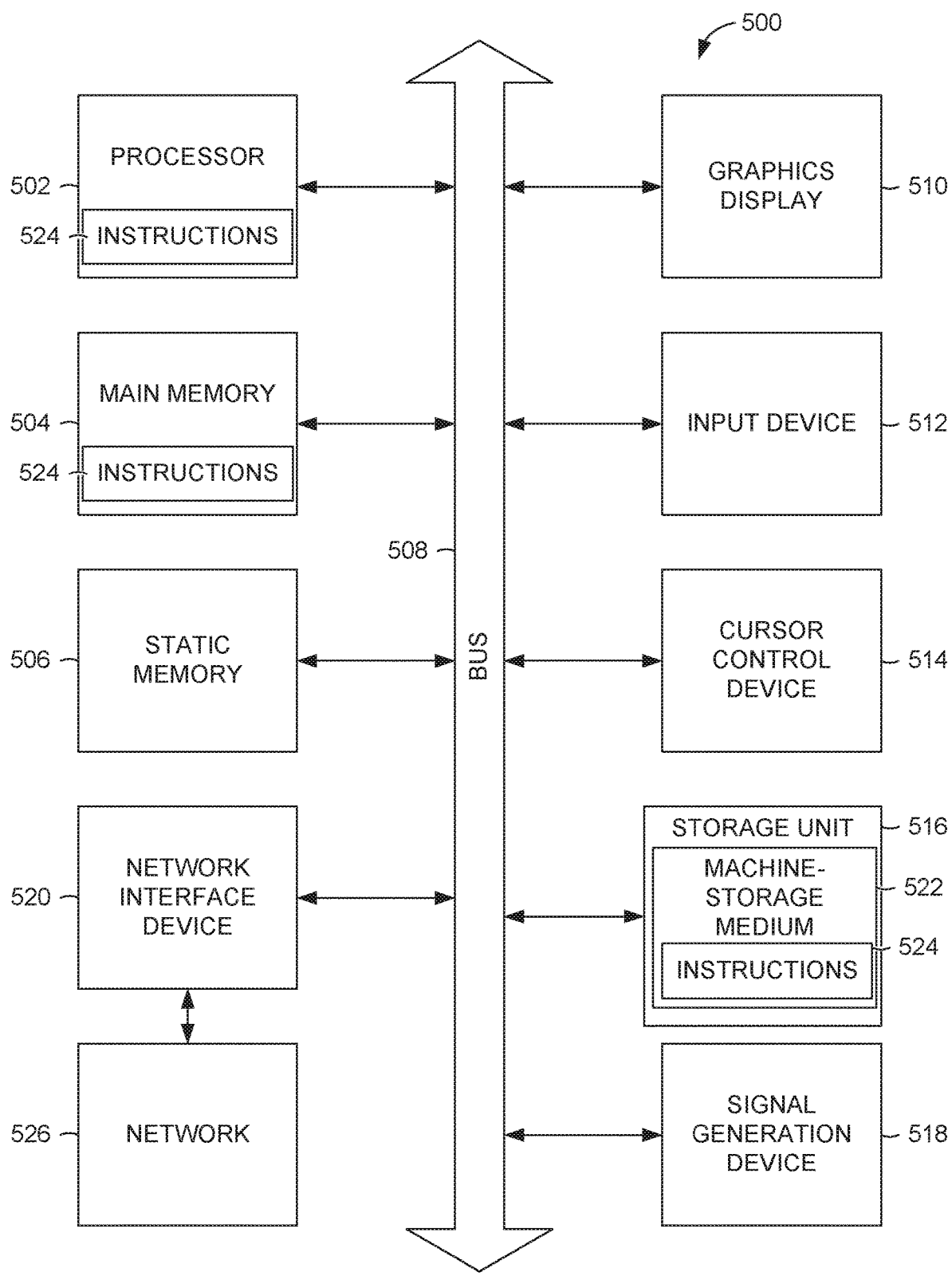
FIG. 5 is a block diagram illustrating components of a machine, according to some example embodiments, able to read instructions from a machine-readable medium and perform any one or more of the methodologies discussed herein.

FIG. 5 illustrates components of a machine 500, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 5 shows a diagrammatic representation of the machine 500 in the example form of a computer device (e.g., a computer) and within which instructions 524 (e.g., software, a program, an application, an applet, an app, or other executable code) for causing the machine 500 to perform any one or more of the methodologies discussed herein may be executed, in whole or in part.

For example, the instructions 524 may cause the machine 500 to execute the flow diagrams of FIGS. 3 and 4. In one embodiment, the instructions 524 can transform the general, non-programmed machine 500 into a particular machine (e.g., specially configured machine) programmed to carry out the described and illustrated functions in the manner described.

In alternative embodiments, the machine 500 operates as a standalone device or may be connected (e.g., networked) to other machines. In a networked deployment, the machine 500 may operate in the capacity of a server machine or a client machine in a server-client network environment, or as a peer machine in a peer-to-peer (or distributed) network environment. The machine 500 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 524 (sequentially or otherwise) that specify actions to be taken by that machine. Further, while only a single machine is illustrated, the term "machine" shall also be taken to include a collection of machines that individually or jointly execute the instructions 524 to perform any one or more of the methodologies discussed herein.

The machine 500 includes a processor 502 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 504, and a static memory 506, which are configured to communicate with each other via a bus 508. The processor 502 may contain microcircuits that are configurable, temporarily or permanently, by some or all of the instructions 524 such that the processor 502 is configurable to perform any one or more of the methodologies described herein, in whole or in part. For example, a set of one or more microcircuits of the processor 502 may be configurable to execute one or more modules (e.g., software modules) described herein.

The machine 500 may further include a graphics display 510 (e.g., a plasma display panel (PDP), a light emitting diode (LED) display, a liquid crystal display (LCD), a projector, or a cathode ray tube (CRT), or any other display capable of displaying graphics or video). The machine 500 may also include an input device 512 (e.g., a keyboard), a cursor control device 514 (e.g., a mouse, a touchpad, a trackball, a joystick, a motion sensor, or other pointing instrument), a storage unit 516, a signal generation device 518 (e.g., a sound card, an amplifier, a speaker, a headphone jack, or any suitable combination thereof), and a network interface device 520.

The storage unit 516 includes a machine-storage medium 522 (e.g., a tangible machine-readable storage medium) on which is stored the instructions 524 (e.g., software) embodying any one or more of the methodologies or functions described herein. The instructions 524 may also reside, completely or at least partially, within the main memory 504, within the processor 502 (e.g., within the processor's cache memory), or both, before or during execution thereof by the machine 500. Accordingly, the main memory 504 and the processor 502 may be considered as machine-readable media (e.g., tangible and non-transitory machine-readable media), The instructions 524 may be transmitted or received over a network 526 via the network interface device 520.

In some example embodiments, the machine 500 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" (referred to collectively as "machine-storage medium 522") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 522 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 522 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 524 may further be transmitted or received over a communications network 526 using a transmission medium via the network interface device 520 and utilizing any one of a number of well-known transfer protocols (e.g., HTTP) Examples of communication networks 526 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 524 for execution by the machine 500, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing cloud service to an onboard aerial vehicle system. The method comprises accessing, by a cloud service system, flight related data; using the flight related data, generating flight operations in a format of an avionics system on an aerial vehicle; establishing a communication link over a communication network between the cloud service system and the aerial vehicle; transmitting, by a hardware processor by the cloud service system, the generated flight operations to the aerial vehicle as digital data sent as data packets over the communication network; monitoring, in real time, the aerial vehicle during a flight, the monitoring comprising receiving and storing in-flight data from the aerial vehicle, the in-flight data being data reconstructed from a plurality of data packets received over the communication network from the aerial vehicle, and determining, based on the received in-flight data, whether to update the flight operations.

In example 2, the subject matter of example 1 can optionally include wherein receiving the in-flight data comprises receiving telemetry data as digital data in real time while the aerial vehicle is in flight.

In example 3, the subject matter of any of examples 1-2 can optionally include responsive to determining to update the flight operations, generating updated flight operations based on the in-flight data; and transmitting the updated flight operations to the aerial vehicle.

In example 4, the subject matter of any of examples 1-3 can optionally include processing flight data post flight, the processing the flight data post flight including analyzing the in-flight data collected over the duration of the flight; and using the processed flight data as feedback to refine a component used to generate future flight operations.

In example 5, the subject matter of any of examples 1-4 can optionally include wherein generating the flight operations comprises applying current trip data to a machine-trained flight operation model.

In example 6, the subject matter of any of examples 1-5 can optionally include wherein generating the flight operations comprises using heuristics based on historical data to select the flight operations.

In example 7, the subject matter of any of examples 1-6 can optionally include wherein the plurality of data packets received over the communication network comprises at least some duplicate data packets received from a multi-modem router onboard the aerial vehicle.

In example 8, the subject matter of any of examples 1-7 can optionally include receiving the plurality of data packets from the aerial vehicle and reconstructing the in-flight data from the plurality of data packets.

In example 9, the subject matter of any of examples 1-8 can optionally include wherein transmitting the generated flight operations to the aerial vehicle comprises transmitting a portion of the flight operations to a component of the aerial vehicle, wherein the portion causes the component to automatically perform an operation.

Example 10 is a system to provide cloud service to an onboard aerial vehicle system. The system includes one or more processors and a memory storing instructions that, when executed by the one or more hardware processors, causes the one or more hardware processors to perform operations comprising accessing flight related data; using the flight related data, generating flight operations in a format of an avionics system on an aerial vehicle; establishing a communication link over a communication network between the cloud service system and the aerial vehicle; transmitting the generated flight operations to the aerial vehicle as digital data sent as data packets over the communication network; monitoring, in real time, the aerial vehicle during a flight, the monitoring comprising receiving and storing in-flight data from the aerial vehicle, the in-flight data being data reconstructed from a plurality of data packets received over the communication network from the aerial vehicle; and determining, based on the received in-flight data, whether to update the flight operations.

In example 11, the subject matter of example 10 can optionally include wherein receiving the in-flight data comprises receiving telemetry data as digital data in real time while the aerial vehicle is in flight.

In example 12, the subject matter of any of examples 10-11 can optionally include wherein the operations further comprise responsive to determining to update the flight operations, generating updated flight operations based on the in-flight data; and transmitting the updated flight operations to the aerial vehicle.

In example 13, the subject matter of any of examples 10-12 can optionally include wherein the operations further comprise processing flight data post flight, the processing the flight data post flight including analyzing the in-flight data collected over the duration of the flight; and using the processed flight data as feedback to refine a component used to generate the flight operations.

In example 14, the subject matter of any of examples 10-13 can optionally include wherein generating the flight operations comprises applying current trip data to a machine-trained flight operation model.

In example 15, the subject matter of any of examples 10-14 can optionally include wherein generating the flight operations comprises using heuristics based on historical data to select the flight operations.

In example 16, the subject matter of any of examples 10-15 can optionally include wherein the plurality of data packets received over the communication network comprises at least some duplicate data packets received from a multi-modem router onboard the aerial vehicle.

In example 17 the subject matter of any of examples 10-16 can optionally include wherein the operations further comprise receiving the plurality of data packets from the aerial vehicle and reconstructing the in-flight data from the plurality of data packets.

In example 18, the subject matter of any of examples 10-17 can optionally include wherein transmitting the generated flight operations to the aerial vehicle comprises transmitting a portion of the flight operations to a component of the aerial vehicle, wherein the portion causes the component to automatically perform an operation.

Example 19 is a machine-storage medium storing instructions for providing cloud service to an onboard aerial vehicle system. The machine-storage medium configures one or more processors to perform operations comprising accessing flight related data; using the flight related data, generating flight operations in a format of an avionics system on an aerial vehicle; establishing a communication link over a communication network between the cloud service system and the aerial vehicle; transmitting the generated flight operations to the aerial vehicle as digital data sent as data packets over the communication network; monitoring, in real time, the aerial vehicle during a flight, the monitoring comprising receiving and storing in-flight data from the aerial vehicle, the in-flight data being data reconstructed from a plurality of data packets received over the communication network from the aerial vehicle; and determining, based on the received in-flight data, whether to update the flight operations.

In example 20, the subject matter of example 19 can optionally include wherein transmitting the generated flight operations to the aerial vehicle comprises transmitting a portion of the flight operations to a component of the aerial vehicle, wherein the portion causes the component to automatically perform an operation.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for providing cloud service to an onboard aircraft system, the method comprising:
   accessing, by a cloud service system, flight related data;
   using the flight related data, generating flight operations in a format of an avionics system on an aircraft;
   establishing a communication link over a communication network between the cloud service system and the aircraft;
   transmitting, by a hardware processor of the cloud service system, the generated flight operations to the aircraft as digital data sent as data packets over the communication network, wherein the generated flight operations are configured to be communicated to a user onboard the aircraft;
   transmitting a portion of the flight operations to a component of the aircraft, wherein the portion causes the component to automatically perform an operation:
   monitoring, in real time, the aircraft during a flight, the monitoring comprising receiving and storing in-flight data from the aircraft, the in-flight data being data reconstructed from a plurality of data packets received over the communication network from the aircraft; and
   determining, based on the received in-flight data, whether to update the flight operations.

2. The method of claim 1, wherein receiving the in-flight data comprises receiving telemetry data as digital data in real time while the aircraft is in flight.

3. The method of claim 1, further comprising:
   responsive to determining to update the flight operations, generating updated flight operations based on the in-flight data; and
   transmitting the updated flight operations to the aircraft.

4. The method of claim 1, further comprising:
   processing flight data post flight, the processing the flight data post flight including analyzing the in-flight data collected over the duration of the flight; and
   using the processed flight data as feedback to refine a component used to generate the flight operations.

5. The method of claim 1, wherein generating the flight operations comprises applying current trip data to a machine-trained flight operation model.

6. The method of claim 1, wherein generating the flight operations comprises using heuristics based on historical data to select the flight operations.

7. The method of claim 1, wherein the plurality of data packets received over the communication network comprises at least some duplicate data packets received from a multi-modem router onboard the aircraft.

8. The method of claim 1, further comprising:
   receiving the plurality of data packets from the aircraft; and
   reconstructing the in-flight data from the plurality of data packets.

9. A system to provide cloud service to an onboard aircraft system, the system comprising:
   one or more hardware processors; and
   memory storing instructions that, when executed by the one or more hardware processors, cause the one or more hardware processors to perform operations comprising:
   accessing flight related data;
   using the flight related data, generating flight operations in a format of an avionics system on an aircraft;
   establishing a communication link over a communication network between the cloud service system and the aircraft;
   transmitting the generated flight operations to the aircraft as digital data sent as data packets over the communication network, wherein the generated flight operations are configured to be communicated to a user onboard the aircraft;
   transmitting a portion of the flight operations to a component of the aircraft, wherein the portion causes the component to automatically perform an operation:
   monitoring, in real time, the aircraft during a flight, the monitoring comprising receiving and storing in-flight data from the aircraft, the in-flight data being data reconstructed from a plurality of data packets received over the communication network from the aircraft; and
   determining, based on the received in-flight data, whether to update the flight operations.

10. The system of claim 9, wherein receiving the in-flight data comprises receiving telemetry data as digital data in real time while the aircraft is in flight.

11. The system of claim 9, where the operations further comprise:
    responsive to determining to update the flight operations, generating updated flight operations based on the in-flight data; and
    transmitting the updated flight operations to the aircraft.

12. The system of claim 9, where the operations further comprise:
    processing flight data post flight, the processing the flight data post flight including analyzing the in-flight data collected over the duration of the flight, and
    using the processed flight data as feedback to refine a component used to generate the flight operations.

13. The system of claim 9, wherein generating the flight operations comprises applying current trip data to a machine-trained flight operation model.

14. The system of claim 9, wherein generating the flight operations comprises using heuristics based on historical data to select the flight operations.

15. The system of claim 9, wherein the plurality of data packets received over the communication network comprises at least some duplicate data packets received from a multi-modem router onboard the aircraft.

16. The system of claim 9, where the operations further comprise:
    receiving the plurality of data packets from the aircraft; and
    reconstructing the in-flight data from the plurality of data packets.

17. A non-transitory machine-storage medium storing instructions that, when executed by one or more hardware processors of a machine, cause the machine to perform operations comprising:
    accessing flight related data;
    using the flight related data, generating flight operations in a format of an avionics system on an aircraft;
    establishing a communication link over a communication network between a cloud service system and the aircraft;
    transmitting the generated flight operations to the aircraft as digital data sent as data packets over the communication network, wherein the generated flight operations are configured to be communicated to a user onboard the aircraft;

transmitting a portion of the flight operations to a component of the aircraft, wherein the portion causes the component to automatically perform an operation;

monitoring, in real time, the aircraft during a flight, the monitoring comprising receiving and storing in-flight data from the aircraft, the in-flight data being data reconstructed from a plurality of data packets received over the communication network from the aircraft; and determining, based on the received in-flight data, whether to update the flight operations.

18. The machine-storage medium of claim 17, wherein transmitting the generated flight operations to the aircraft comprises transmitting a portion of the flight operations to a component of the aircraft, wherein the portion causes the component to automatically perform an operation.

* * * * *